United States Patent [19]

Fujii

[11] 4,145,140
[45] Mar. 20, 1979

[54] MEASUREMENT OF SURFACE ROUGHNESS

[76] Inventor: Hitoshi Fujii, 770 Belmont, Apt. 106, Ste-Foy, Quebec City, Québec, Canada, G1V2W9

[21] Appl. No.: 806,708

[22] Filed: Jun. 15, 1977

[51] Int. Cl.$^2$ .............................................. G01B 9/02
[52] U.S. Cl. .................................... 356/360; 356/371
[58] Field of Search ................................ 356/120, 109

[56] References Cited

U.S. PATENT DOCUMENTS 3,804,521  4/1974  Sprague ............................... 356/120

OTHER PUBLICATIONS

Fujii et al., "Measurement of Surface Roughness Properties by Using Image Speckle Contrast", *J. Opt. Soc. Am.*, vol. 66, No. 11, Nov. 1976, pp. 1217–1222.

*Primary Examiner*—John K. Corbin
*Assistant Examiner*—R. A. Rosenberger
*Attorney, Agent, or Firm*—Charles E. Brown

[57] ABSTRACT

A method and apparatus for measuring surface roughness, waviness, cracks or any irregularities or flatnesses in a surface utilizing statistical properties of dichromatic speckle patterns. In practice surface roughness is normally measured utilizing standard profile measuring devices. However, these instruments are not efficient in practice in view of their slowness for effecting measurements. The present invention provides an improved method of measuring surface roughness including the following steps; generating a spatially coherent polychromatic light having at least two wavelengths and directing the light at an optically rough surface in order to illuminate the same; analyzing intensity variations in two speckle patterns formed at a plane due to two wavelengths of the polychromatic light; and defining and evaluating a difference between intensities of the two speckle patterns as a function of surface roughness of the optically rough surface.

9 Claims, 4 Drawing Figures

MEASUREMENT OF SURFACE ROUGHNESS

BACKGROUND OF THE INVENTION

1. Field of the Invention

This invention relates to a method and apparatus for measuring surface roughness, waviness, cracks or any irregularities or flatnesses in a surface utilizing statistical properties of dichromatic speckle patterns.

2. Description of the Prior Art

In practice, surface roughness is normally measured utilizing standard profile measuring devices or stylus instruments, the stylus instrument having a very fine diamond point designed to penetrate the full depths of depressions in the surface being tested as the stylus is drawn across a portion of the surface. Vertical movements of the stylus are amplified and are recorded on an instrument scale or recorder graph, while a lateral movement scale is likewise magnified. The pressure of the diamond stylus on the surface being measured must be accurately maintained, such that the point remains in contact with the peaks and valleys of the surface without ant tendency to bounce off. On the other hand, the pressure must not be too great, otherwise wear and inertial effects may occur. As a commercial method for measuring surface roughness, the principal drawbacks with the use of the stylus are its slowness for effecting measurements and its effect on the surface being measured.

To overcome these drawbacks, the present invention provides a nonmechanical-contact method of measuring surface roughness which can be carried out quite quickly. Further, the method according to the present invention permits the testing of surface roughness while the surface is being ground without removing the test object from a machine. Thus, the present invention permits in process measurement of surface roughness, a further advantage thereof over the known conventional techniques of measuring surface roughness. As such, the method and apparatus according to the present invention can be used to maintain quality control of surface roughness in a commercial process.

The remote measurement of the surface properties utilizing speckle patterns has recently become a new application in the field of lasers. Based on studies conducted to date, methods have been proposed for measuring surface roughness based on the statistical properties of speckle patterns. For example, a relatively simple method based on measurement of the contrast of speckle patterns has been proposed for measuring the root mean square (rms) roughness of optically smooth surfaces having an rms roughness less than the wavelength of the light illuminating the surface. Further, investigations have been conducted which demonstrate that lasers can be used for evaluating the surface roughness of optically rough surfaces.

For example, methods have been proposed for measuring surface roughness utilizing monochromatic light as the light source. However, with monochromatic light, one is not able to achieve the same range of surface roughness measurements as can be obtained by the present invention utilizing dichromatic light as the light source. With monochromatic light, the sensitivity is so high that the measuring range is restricted to 0 to 0.2 $\mu$m. On the other hand, the present invention permits the effective measurement of surface roughness of optically rough surfaces within the range of measurements most frequently encountered in practical engineering applications and commercial processes. In particular, the present invention utilizes intensity differences of two speckle patterns produced by illuminating an object surface with polychromatic light from a light source such as an argon ion laser. With the argon ion laser, appropriate wavelengths can be chosen to give a full scale range of root mean square (rms) roughness varying from 0.5 $\mu$m to 4 $\mu$m. Further, according to the present invention, the sensitivity of measuring range can be easily altered despite the fact that a single source of dichromatic light is being used, such as the argon ion laser, a tunable dye laser, a mercury arc lamp, or the like.

U.S. Pat. No. 3,804,521 to Sprague discloses that light scattered at a surface can be used to gauge the roughness of a surface. One of the problems associated with the Sprague method relates to the illuminating source. In this regard, Sprague proposes a point source produced by a thermal light (tungsten-zirconium arc) which is extremely weak in comparison with a laser. Furthere, it is difficult to vary the band of the spectrum of visible light and, with his method, many bandpass optical filters having different band widths are necessary to change the coherence length, or to change the sensitivity of roughness measurement. Such optical filters result in a further loss of light sensitivity. Since the light source utilized by Sprague is relatively weak, the measurements obtained are, of necessity, affected by the ambient light within the area in which the Sprague apparatus is utilized. This effect on the measurements obtained due to ambient light is referred to as noise, and can adversely affect accuracy of the results obtained with the Sprague method and apparatus. Farther, in the case of the Sprague patent, the light source must be located relatively close to the object surface to minimize noise effects. On the other hand, according to the Applicant's method, since a high power laser can be utilized as the source, even remote measurement with a long distance between the light source and the object surface becomes possible.

SUMMARY OF THE INVENTION

The method according to the present invention includes the following steps; generating a spatially coherent polychromatic light having at least two wavelengths and directing the light at an optically rough surface in order to illuminate the same; analyzing intensity variations in two speckle patterns formed at a plane due to two wavelengths of the polychromatic light; and defining and evaluating a difference between intensities of the two speckle patterns as a function of surface roughness of the optically rough surface.

According to one embodiment of the present invention, the method includes the step of varying the wavelengths contained in a dichromatic illuminating light, thereby controlling the effective measuring range of surface roughness which can be evaluated utilizing the method.

According to a further embodiment of the invention, the method includes the step of defining and evaluating the root mean square (rms) difference between the intensities of the two speckle patterns as a function of the rms of the surface roughness, the rms difference increasing with increasing surface roughness of the optically rough surface.

The apparatus according to the present invention comprises a laser adapted illuminate with a spatially coherent dichromatic light an optically rough surface of an object situated in an object plane. An aperture is placed between the laser and the surface to be tested, such that light from the laser passing through the aperture impinges on the rough surface. Means are provided in a specular direction at a scattered light plane separated from the object plane by a predetermined distance to analyze the dichromatic speckle pattern produced at the plane by light scattered from the optically rough surface.

According to one embodiment of the apparatus, the means is situated as a far-field diffraction plane and comprises a pinhole located in the diffraction plane for detecting scattered light from the rough surface, a concave grating situated on a side of the pinhole opposite from the optically rough surface, and two photodetectors utilized to analyze the dichromatic speckle pattern. Relative motion between the optically rough surface and the apparatus results in two intensities being detected by the two photodetectors and their differences are varied in time. Signals generated by the photodetectors are fed into an analyzing circuit which is provided to calculate the average difference between the two wavelengths.

BRIEF DESCRIPTION OF THE DRAWINGS

In the drawings which illustrate embodiments of the present invention.

DESCRIPTION OF PREFERRED EMBODIMENTS

Figure 1:
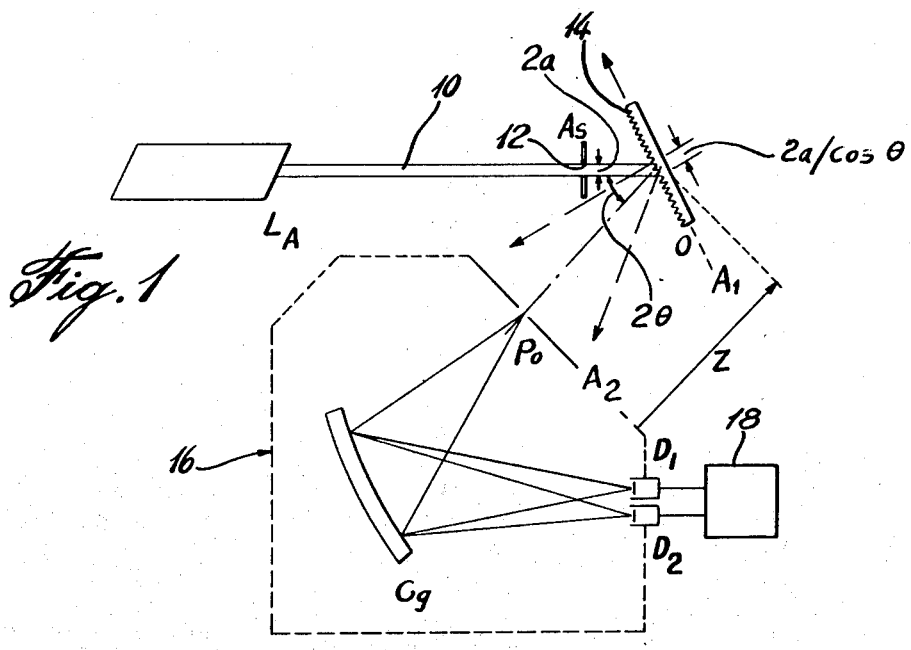
FIG. 1 is a schematic illustration of the apparatus used for carrying out the method according to the present invention.

As best seen in FIG. 1, an argon ion laser $L_A$ generates a two-wavelength laser beam 10, the light passing through an aperture, the aperture 12 situated in a plane $A_s$ and having a width 2a. The light illuminates a rough surface 14 of an object O situated in an object plane $A_1$, the light impinging on the object surface 14 at an incident angle $\theta$. The size of the area of the object surface illuminated by the light is equal to a $2a/\cos\theta$.

The object surface 14 scatters the light, and a small pinhole Po detects a portion of the scattered light. The pinhole Po is situated in a specular direction at a far-field diffraction plane $A_2$ separated from the object plane $A_1$ by a distance Z. The pinhole PO permits passage of a portion of the scattered light into a simple spectrometer 16, the spectrometer including a concave grating Cg and two photodetectors $D_1$ and $D_2$. The concave grating Cg and the two photodetectors $D_1$ and $D_2$ analyze the dichromatic or two wavelength speckle pattern produced at the far-field diffraction plane $A_2$.

As a result of relative motion between the test surface 14 and the measuring apparatus 16, two intensities are detected by the photodetectors $D_1$ and $D_2$, and the difference between the two intensities varies in time. Two signals from the photodetectors $D_1$ and $D_2$ are fed into an analyzing circuit, 18, as shown in FIG. 1, which is provided to calculate the average differences $\widetilde{V}$ or $\hat{V}$ between the two signals as defined by equations (4), (6) and (15), set out below.

Figure 2:
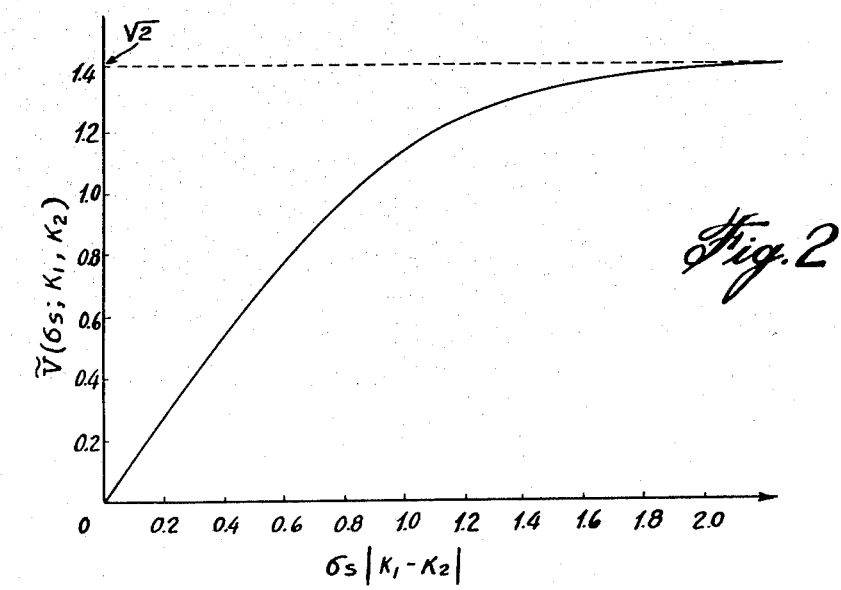
FIG. 2 is a theoretical curve of rms difference plotted against the product of rms roughness of an object surface and the difference of two wave numbers.
Figure 4:
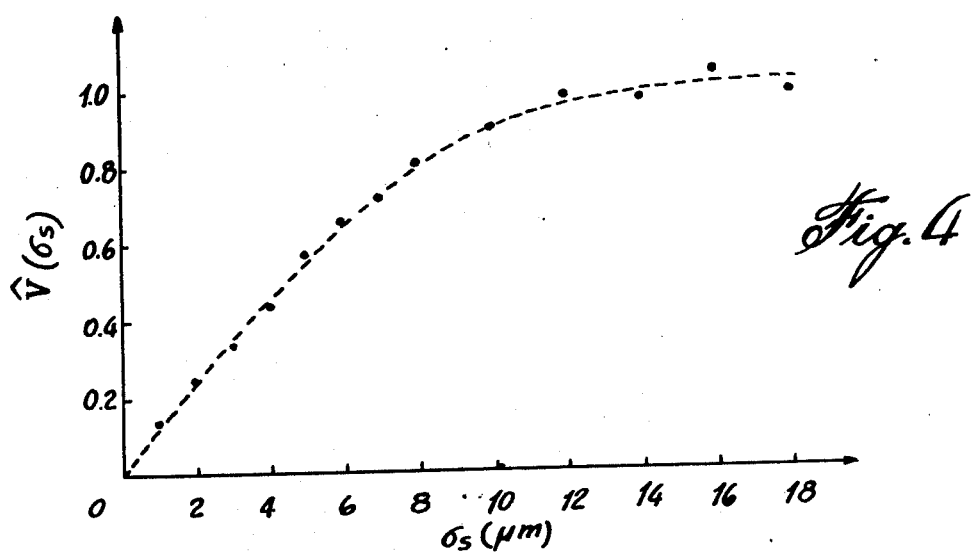
FIG. 4 is a graph of mean deviation of the difference evaluated in a manner similar to the graph of FIG. 3.

By comparing the measured values of the difference $\widetilde{V}$ ($=\overline{V}$) or $\hat{V}$ to the theoretical curves of FIG. 2 or predetermined experimental curve of FIG. 4, the roughness of the surface can be determined.

The rms difference between the intensities of the two speckle patterns produced at the far-field diffraction plane $A_2$ is defined and evaluated as a function of the rms of the surface roughness. As noted below, the rms difference increases with an increase in the surface roughness.

The effective measuring range or the sensitivity of the apparatus for measuring surface roughness according to the present invention can be changed by varying the two wavelengths of the laser beam 10. In the case of an argon ion laser $L_A$, appropriate wavelengths can be chosen to give full scale ranges of rms roughness varying from 0 to 0.5μm to 0 to 4μm, thus covering the most important regions of practical surface roughness ordinarily encountered in engineering applications.

In addition to analyzing the dichromatic speckle pattern produced at the far-field diffraction plane $A_2$ as described in detail above, it is also within the scope of the present invention to utilize a dichromatic speckle pattern produced in a near field diffraction plane or, using a lens system, in the image plane of the object rough surface, bearing in mind that the speckle pattern appears everywhere in the light field scattered from the optically rough surface. In other words, the method according to the present invention is available in every scattered-light field where a dichromatic speckle pattern is formed, including near or far-field diffraction planes, or the image plane of the object.

It should also be noted that dichromatic illumination is not essential to the method according to the present invention. Indeed, polychromatic light with many line spectra or broadband spectrum can be used to produce a polychromatic speckle pattern which is regarded as the superposition of many speckle patterns having different tones. The essence of the present invention is to select two speckle intensity distributions with two tones (dichromatic speckle) utilizing the spectrometer and to define and measure their difference. As a result, this method differs from previously known methods in which measurement is made of the sum of a large number of speckle patterns having various tones (white-light speckle).

The following is a theoretical analysis of the structural difference of the two speckle patterns produced at the plane $A_2$ by illuminating the object surface 14 with dichromatic or two wavelength light. The collimated dichromatic beam 10 has two wavelengths $\lambda_1$, $\lambda_2$, the dichromatic beam illuminating the rough surface 14 situated at the object plane $A_1$, and the scattered light is detected at a far-field diffraction plane $A_2$ separated from the plane $A_1$ by a distance Z.

For mathematical simplicity, it is assumed that the illuminating beam is spatially coherent and its amplitude distribution is uniform within the aperture $A_s$. Further, the reflection coefficient of the object O is assumed to be unity (a pure phase object) and the simplest one-dimensional case is considered here. The intensity distribution I ($\xi$) at the observing plane $A_2$ is a sum of two speckle patterns produced by each wavelength component of the dichromatic light, as expressed by the following:

$$I(\xi; k_1, k_2) = I(\xi, k_1) + I(\xi, k_2), \quad (1)$$

$$I(\xi, k_j) = |U(\xi, k_j)|^2, (j = 1,2), \quad (2)$$

$$U(\xi, k_j) = \frac{iC_j}{\sqrt{\lambda_j Z}} \int_{-a'}^{a'} \exp\{-ik_j(\frac{x\xi}{Z} + S(x))\} dx, \quad (3)$$

where: $U(\xi, k_j)$ is the complex amplitude distribution at the plane $A_2$; $C_j$ is a constant denoting the amplitude of each component of incident light; $2a' = 2a/\cos\theta$ is the width of illuminated area; $k_j = 2\pi/\lambda_j$; and $S(x)$ is the random optical path variation due to the rough surface O.

In order to study the effect of object surface roughness on the structural difference of two speckle intensity distributions, the root-means-square difference of the two distributions is defined by a function $\tilde{V}(\xi_1, \xi_2, k_1, k_2)$, i.e., $$\tilde{v}(\xi_1, \xi_2; k_1, k_2) = \left\langle \left( \frac{I(\xi_1, k_1)}{<I(\xi_1, k_1)>} - \frac{I(\xi_2, k_2)}{<I(\xi_2, k_2)>} \right)^2 \right\rangle^{\frac{1}{2}}, \quad (4)$$

where $<...>$ denotes ensemble average, and the normalized intensity distributions are used for convenience in the following calculations. $\{\tilde{V}(\xi_1, \xi_2; k_1, k_2)\}^2$ is the so-called structure function often used to describe the magnitude of fluctuation of random media. For simplicity, we shall consider only the on-axis intensity $I(O,k_j) = I(k_j)$ which fluctuates according to the translation of the rough surface across the illuminating light. Equation (4) then becomes:

$$\tilde{v}(0, 0; k_1, k_2) = \quad (5)$$

$$\left\{ \frac{<I(k_1)^2>}{<I(k_1)>^2} + \frac{<I(k_2)^2>}{<I(k_2)>^2} - \frac{2<I(k_1)I(k_2)>}{<I(k_1)><I(k_2)>} \right\}^{\frac{1}{2}}$$

Now, assuming that the object surface is optically rough within the illuminated area, $2a'$ so that many scattered light components are superposed randomly. Under this condition, the complex amplitude $U(\xi,k_j)$ of the resultant speckle patterns is expressed approximately by a circular complex gaussian random variable, and equation (5) is reduced to:

$$\tilde{v}(0, 0; k_1, k_2) = \left\{ 4 - \frac{2<I(k_1)I(k_2)>}{<I(k_1)><I(k_2)>} \right\}^{\frac{1}{2}} \quad (6)$$

$$= \{ 2(1 - |\Gamma(k_1, k_2)|^2/<I(k_1)><I(k_2)>) \}^{\frac{1}{2}}, \quad (7)$$

where $$\Gamma(k_1,k_2) = <U(O,k_1) U^*(O,k_2)>,$$

and where the well known relations $<I(k_j)^2> = 2<I(k_j)>^2$ and $<I(k_1) I(k_2)> = <I(k_1)><I(k_2)> + |\Gamma(k_1, k_2)|^2$ are used.

In order to evaluate equations (7) and (8), the simplest case in which the surface height fluctuation follows a gaussian random process is considered. Thus, equation (8) becomes $$\Gamma(k_1, k_2) = \quad (9)$$

$$\frac{C_1 C_2 \sqrt{k_1 k_2}}{2\pi Z} \iint_{-a'}^{a'} <\exp[-i\{k_1 S(x_1) - k_2 S(x_2)\}]> dx_1 dx_2 =$$

$$\frac{C_1 C_2 \sqrt{k_1 k_2}}{2\pi Z} \iint_{-a'}^{a'} \exp[-\frac{1}{2} \sigma_s^2 \{k_1^2 + k_2^2 - 2k_1 k_2 \rho_s(x_1 - x_2)\}] dx_1 dx_2,$$

where $\delta_s$ and $\rho_s(x_1-x_2)$ are the standard deviation and the normalized autocorrelation function of the optical path fluctuation, respectively. These two parameters are connected to the actual surface height variation by some relation.

For simplicity, we take a triangular function for the autocorrelation, i.e., $$\rho_s(x_1 - x_2) = 1 - \frac{|x_1 - x_2|}{\alpha} \text{ for } |x_1 - x_2| \leq \alpha, \quad (10)$$

$$= 0 \quad \text{for } |x_1 - x_2| > \alpha,$$

where $\alpha$ is the correlation length. By substituting equation (10) into equation (9), the following is obtained:

$$\Gamma(k_1, k_2) = \quad (11)$$

$$\frac{C_1 C_2 \sqrt{k_1 k_2}}{\pi Z} [(\frac{\alpha^2}{D}) \{(\frac{2a'}{\alpha} - \frac{1}{D})(1 - \exp(-D)) +$$

$$\exp(-D)\} \times \exp\{-\frac{1}{2}\sigma_s^2(k_1 - k_2)^2\} +$$

$$\frac{1}{2}(2a' - \alpha)^2 \exp\{-\frac{1}{2}\sigma_s^2(k_1^2 + k_2^2)\}]$$

$$= \frac{2C_1 C_2 a'}{\pi Z \sqrt{k_1 k_2}} (\frac{\alpha}{\sigma_s^2}) \exp\{-\frac{1}{2}\sigma_s^2(k_1 - k_2)^2\}, \quad (12)$$

where $D = k_1 k_2 \sigma_s^2$, and the approximations $\exp(-D) \sim 0$; $\exp(-k_j^2 \sigma_s^2) \sim 0$; and $2a'/\alpha >> 1/D$ are used. From equation (12) the mean intensity is given by $$<I(k_j)> = \frac{2C_j^2 a'}{\pi Z k_j} (\frac{\alpha}{\sigma_s^2}). \quad (13)$$

Substituting equations (12) and (13) into equation (7), the following is obtained:

$$\tilde{V}(\sigma_s; k_1, k_2) = \tilde{v}(0, 0; k_1, k_2) \quad (14)$$

$$= \sqrt{2[1 - \exp\{-\sigma_s^2(k_1 - k_2)^2\}]},$$

which is one of the simplest theoretical relations between the roughness of the object surface and the statistical property of speckle patterns.

FIG. 2 shows a theoretical curve for the functions $\tilde{V}(\sigma_s; k_1, k_2)$ (referred to here for convenience as rms difference) evaluated from equation (12). An excellent proportional relation between the surface roughness $\sigma_s$ and rms difference $\tilde{V}(\sigma_s; k_1; k_2)$ is achieved. The effective measuring range $\sigma_e \delta 1/|k_1-k_2|$ in the theoretical curve of FIG. 2 is determined by the difference of two wave numbers $k_1$ and $k_2$ comprising the dichromatic light. If an argon ion laser contaning six line spectra ($\lambda = 514.5, 501.7, 496.5, 488.0, 476.5, 457.9$nm) is used, several combinations of these lines can be selected, permitting variation in the measuring range from $\sigma_e = 0.66\mu$m to $7.69\mu$m. Due to reflection, the actual range of rms roughness for a metal surface is $\sigma_e' = 0.33$–$3.8\mu$m.

It is interesting to note that the measuring range $\sigma_e$ in the present case is the same with the minimum roughness of object surface required to decorrelate the dichromatic speckle patterns, as is known from previouos studies of the correlation function and the constant of polychromatic speckle patterns. This fact shows a basic phenomenon utilized here, that is, the rms difference increases with increasing object surface roughness until the dichromatic speckle pattern becomes completely decorrelated.

In order to verify the theoretical results, a computer simulation study was conducted on the statistical properties of dichromatic speckle patterns. By using computer generated rough surfaces, two intensity variations in the dichromatic speckle pattern are calculated for many sets of sample surfaces. These two intensity variations are substituted into equation (5), then, the rms difference is calculated numerically. In the present study, more than 20,000 random numbers for generating gaussian rough surface were taken, the ratio of aperture size and the correlated length of surface height was chosen to be ten, i.e. $2a'/\alpha = 10$, and the rms roughness of the object surface was varied from $\sigma_s = 0.5\mu$m to $\sigma_s = 14\mu$m.

Figure 3:
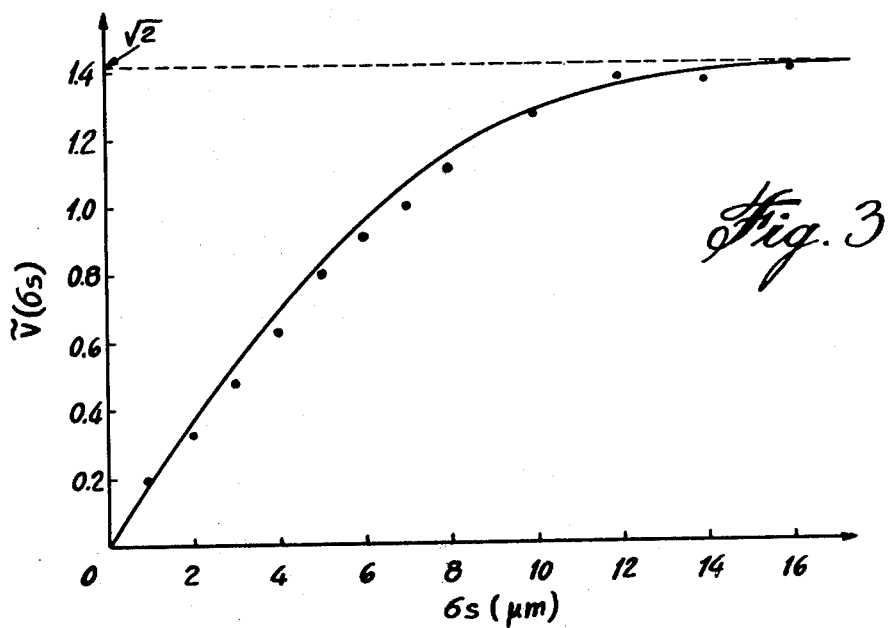
FIG. 3 is a graph of rms difference evaluated from a computer simulation study for a set of sample surfaces having different surface roughnesses.

FIG. 3 shows one of the results of the rms difference plotted against the rms roughness of object surface, where a pair of lines $\lambda_1 = 501.7$nm and $\lambda_2 = 496.5$nm of an argon ion laser were taken for the illuminating light. The corresponding theoretical curve of rms difference is plotted together by the solid line. From FIG. 3, it is seen that a good agreement between the results of theoretical derivation and the computer simulation study is obtained.

In the practical measurement of some fluctuations, the mean deviation value is often taken instead of rms value. For a gaussian random process $F(t)$, both mean values are connected by the simple relation, $$<|\Delta F(t)|> = \sqrt{2} <\{\Delta F(t)\}^2>/\pi,$$

where $$\Delta F(t) = F(t) - <F(t)>.$$

In parallel with the above numerical calculations of rms difference, the mean deviation defined by the following was also evaluated.

$$\hat{V}(\sigma_s; k_1, k_2) = \left\langle \left| \frac{I(k_1)}{<I(k_1)>} - \frac{I(k_2)}{<I(k_2)>} \right| \right\rangle. \tag{15}$$

FIG. 4 shows the results of $\hat{V}(\mu_s; k_1, k_2)$ where the conditions of roughness and illuminating light are the same as those in FIG. 3. A smooth proportional relation between roughness and the mean deviation $\hat{V}$ is obtained from the computer simulation study.

Thus, just as the rms difference as defined by equations (4) or (6), this function $\hat{V}$ is also useful for practical measurements.

In view of the above, it has been demonstrated that it is possible according to the present invention to estimate surface roughness by measuring the rms difference of two normalized intensity distributions in a dichromatic speckle pattern produced at the far-field diffraction plane of an object surface. Some computer simulation studies have verified the theoretical results and the usefulness of the present method. The measurement of the mean deviation of the difference is available for the actual measurements as well as that of rms difference. Further, it is of considerable practical value that the measuring range can be selected by varying the difference of two wavenumbers of dichromatic light. When an argon ion laser is used as the illuminating light source, the measuring range of rms roughness for the actual metal surfaces is varied from $0.5\mu$m to $4\mu$m, this range being of particular importance in precision engineering.

I claim:

1. A method for measuring surface roughness, surface waviness, surface cracks, or any irregularities or flatnesses in a surface, including the following steps:
   generating a spatially coherent polychromatic light having at last two different wavelengths and directing the polychromatic light at an optically rough surface in order to iliuminate the same;
   analyzing intensity variations in two speckle patterns formed at a light field scattered from the optically rough surface due to the two different wavelengths of the polychromatic light; and
   defining and evaluating a difference between intensities of the two speckle patterns as a function of surface roughness of the optically rough surface.

2. A method according to claim 1, wherein dichromatic light is utilized and including the step of varying the wavelengths contained in the dichromatic illuminating light, thereby controlling the effective measuring range of surface roughness which can be evaluated using the method.

3. A method according to claim 2, including the step of defining and evaluating the root mean square (rms) difference between the intensities of the two speckle patterns as a function of the root mean square (rms) of the surface roughness, the rms difference increasing with increasing surface roughness of the optically rough surface.

4. A method according to claim 3, wherein the dichromatic light impinges on the optically rough surface at an incident angle $\theta$ relative to the surface.

5. An apparatus for measuring surface roughness, surface waviness, surface cracks or any irregularities or flatnesses in a surface, the apparatus comprising a laser adapted to generate a spatially coherent polychromatic light having two different wavelengths which is directed at an optically rough surface of an object situated in an object plane; an aperture placed between the laser and the optically rough surface of the object to be tested, such that the polychromatic light from the laser passes through the aperture and impinges on the optically rough surface; separate means being provided in a specular direction at a scattered light plane separated from the object plane by a predetermined distance to analyze a dichromatic speckle pattern produced at the plane by light from each of said two different wavelengths scattered from the optically rough surface.

6. An apparatus according to claim 5, wherein the means is situated at a far field diffraction plane and comprises a pinhole located in the diffraction plane for detecting scattered light from the optically rough surface, and said separate means including two photodetectors utilized to analyze the dichromatic speckle pattern, relative movement between the optically rough surface and the apparatus resulting in two intensities being detected by the two photodetectors and their differences being varied in time, signals generated by their photodetectors being fed into an analyzing circuit which is provided to calculate the average difference between the two wavelengths.

7. An apparatus according to claim 6, wherein light generated by the laser impinges on the optically rough surface at an incident angle $\theta$, and the aperture has a width 2a.

8. An apparatus according to claim 6 together with a concave grating situated on a side of the pinhole opposite from the optically rough surface.

9. An apparatus according to claim 5, wherein light generated by the laser impinges on the optically rough surface at an incident angle $\theta$, and the aperture has a width 2a.

* * * * *